US011256440B2

United States Patent
Martinez Lerin et al.

(10) Patent No.: US 11,256,440 B2
(45) Date of Patent: Feb. 22, 2022

(54) METHOD AND DISTRIBUTED STORAGE SYSTEM FOR AGGREGATING STATISTICS

(71) Applicant: HITACHI, LTD., Tokyo (JP)

(72) Inventors: Pablo Martinez Lerin, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 322 days.

(21) Appl. No.: 16/318,036

(22) PCT Filed: Dec. 21, 2016

(86) PCT No.: PCT/JP2016/088027
§ 371 (c)(1),
(2) Date: Jan. 15, 2019

(87) PCT Pub. No.: WO2018/116389
PCT Pub. Date: Jun. 28, 2018

(65) Prior Publication Data
US 2021/0278991 A1    Sep. 9, 2021

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0653* (2013.01); *G06F 3/0604* (2013.01); *G06F 3/067* (2013.01)

(58) Field of Classification Search
CPC ....... G06F 3/0653; G06F 3/067; G06F 3/0604
See application file for complete search history.

(56) References Cited

U.S. PATENT DOCUMENTS

| 7,783,647 B2 | 8/2010 | Cormode et al. |
| 2005/0223096 A1 | 10/2005 | Shinkai |
| 2011/0191477 A1* | 8/2011 | Zhang ................. H04L 43/0876 709/226 |
| 2013/0018868 A1* | 1/2013 | Chi ....................... G06F 16/951 707/722 |
| 2014/0046997 A1* | 2/2014 | Dain ................... H04L 67/2861 709/201 |
| 2015/0052242 A1 | 2/2015 | Itou |
| 2017/0177273 A1* | 6/2017 | Fomin .................. G06F 3/0653 |
| 2018/0139148 A1* | 5/2018 | Gamage ............... H04L 47/822 |

OTHER PUBLICATIONS

Japanese Office Action dated Mar. 31, 2020 for the Japanese Patent Application No. 2019-504991.

(Continued)

*Primary Examiner* — Mark A Giardino, Jr.
(74) *Attorney, Agent, or Firm* — Volpe Koenig

(57) ABSTRACT

A distributed storage system comprises a plurality of storage nodes which includes multiple resources including multiple kinds of resources. Each of the multiple storage nodes among the plurality of storage nodes is configured to execute an aggregation task which has been assigned to the storage node among aggregation tasks, Each of the aggregation tasks is a task for aggregating statistics relating to a resource among the multiple resources which corresponds to the task, to the storage node to which the task has been assigned.

12 Claims, 12 Drawing Sheets

(56) References Cited

OTHER PUBLICATIONS

NoSQL Guide for Kawamura, RDB engineers, Shuwa System Co., Ltd (Feb. 24, 2016) (with English concise explanation of relevance provided by English translation of Japanese Office Action dated Mar. 31, 2020 for the Japanese Patent Application No. 2019-504991).

International Search Report for PCT/JP2016/088027 A1, dated May 16, 2017.

* cited by examiner

FIG. 3A

Storage configuration table
2001

| Resource id | Resource owner | Resource type | Related nodes |
|---|---|---|---|
| R1 | Dept1 | Block Store (LU) | N1, N2 |
| R2 | Dept1 | Block Store (LU) | N2, N4 |
| R3 | Dept2 | File Store (File System) | N1, N3, N4 |
| ... | ... | ... | ... |

Columns: 3001, 3002, 3003, 3004

FIG. 3B

Storage configuration table
2001'

| Resource id | Resource owner | Resource type | Related nodes (source 1) | Related nodes (source 2) |
|---|---|---|---|---|
| R1 | Dept1 | Block Store (LU) | N2, N4 | N3, N4 |
| R2 | Dept1 | Block Store (LU) | N1, N3, N4 | N3, N4, N5, N6 |
| R3 | Dept2 | File Store (File System) | N1 | N4 |
| ... | ... | ... | ... | ... |

Columns: 3001, 3002, 3003, 3005, 3006

FIG. 4

Node aggregation load table
2002

| Node id | Aggregation load | Cluster statistics load | Resources load |
|---|---|---|---|
| N1 | 1510 | 60 | 20 |
| N2 | 1500 | 90 | 30 |
| N3 | 600 | 50 | 25 |
| ... | ... | ... | ... |

Cluster statistics table
2003

| Cluster statistic id | Statistic type | Related resource id | Assigned node | High contribution nodes | High consumption nodes |
|---|---|---|---|---|---|
| CS1 | IOPS | R1 | N1 | N1 | N1 |
| CS2 | Throughput | R1 | N3 | N1, N2 | N2 |
| ... | ... | ... | ... | ... | ... |

Cluster statistics table
2003'

| Cluster statistic id | Statistic type | Related resource id | Assigned node | High contribution nodes | High consumption nodes | Selected aggregation source |
|---|---|---|---|---|---|---|
| CS1 | IOPS | R1 | N1 | N1 | N1 | Source 1 |
| CS2 | Throughput | R1 | N3 | N1, N2 | N2 | Source 2 |
| ... | ... | ... | ... | ... | ... | ... |

Aggregation source table
2004

| Cluster statistic id | Recent source nodes | Recent source count |
|---|---|---|
| CS1 | N1, N2, N3, N4 | 4 |
| CS2 | N1, N2, N3 | 3 |
| ... | ... | ... |

Aggregation source table
2004'

| Cluster statistic id | Recent source nodes (source 1) | Recent source count (source 1) | Recent source nodes (source 2) | Recent source count (source 2) |
|---|---|---|---|---|
| CS1 | N1, N2, N3, N4 | 4 | N1 | 1 |
| CS2 | N1, N2, N3 | 3 | N1, N3 | 2 |
| ... | ... | ... | ... | ... |

(6001) (6004) (6005) (6006) (6007)

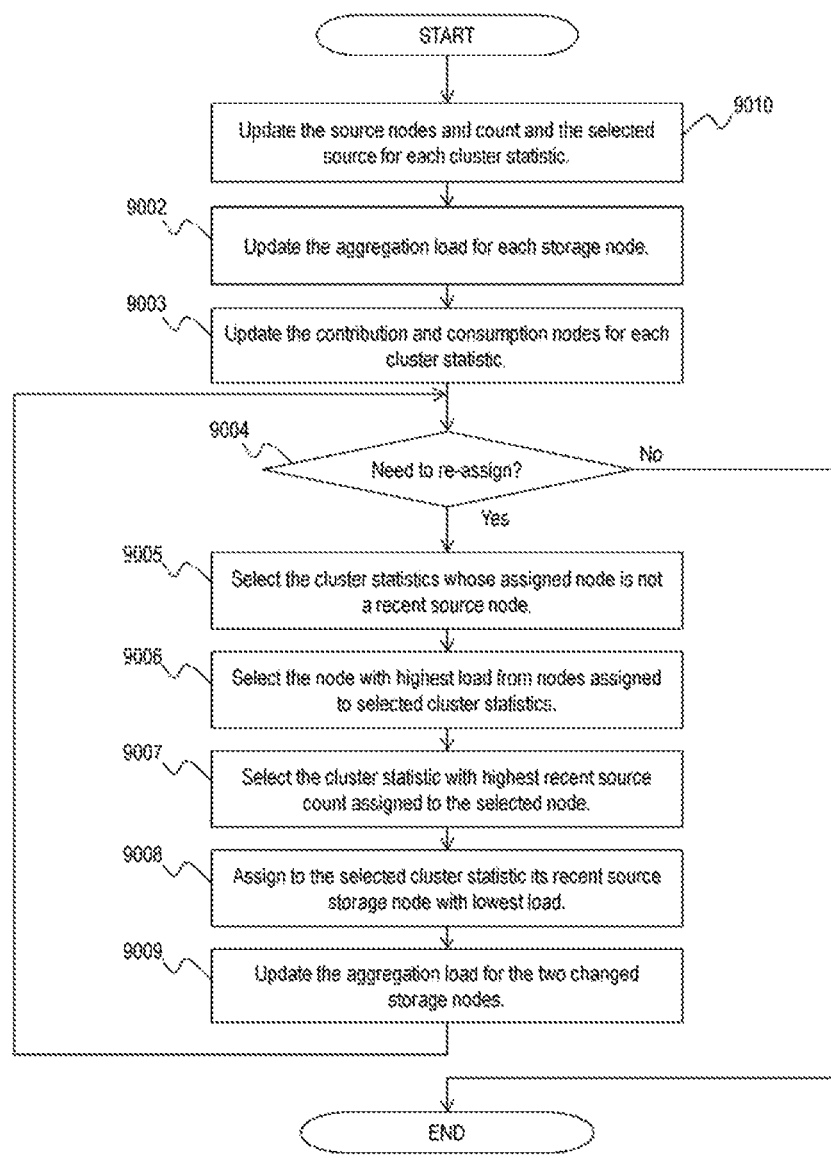

METHOD AND DISTRIBUTED STORAGE SYSTEM FOR AGGREGATING STATISTICS

TECHNICAL FIELD

The present invention generally relates to management of statistics in a storage system.

BACKGROUND ART

Distributed storage systems are generally a popular storage solution to achieve high performance as well as start small and scale out quickly. A distributed storage system is a cluster comprising one or more (typically, a plurality of) storage nodes and provides one or more data stores (e.g. LUs (Logical Units), file systems).

In a distributed storage system, since some client systems can access a data store provided by multiple storage nodes at the same time, each per-node statistics (for example, IOPS related to the data store or IOPS related to the client systems) measured in each storage node relating to the data store and the client systems needs to be aggregated, in order to, for example, achieve a global understanding of a data store usage. Statistics of data stores are important for use cases such as troubleshooting, planning and billing in enterprise storages.

In traditional distributed storage systems, only one of the storage nodes (i.e. a head node) or a dedicated computer that does not provide access to data stores (i.e. a management computer) aggregate statistics from all storage nodes. However, it is a problem that the head node or dedicated computer becomes easily a bottleneck for large-scale distributed storage system which can provide millions of data stores and comprise hundreds to thousands of storage nodes.

As a method to reduce the number of communications from the storage nodes to the head or dedicated node and the amount of data to be aggregated, for example, Patent Literature 1 discloses a method that introduces a bounded estimation in the aggregated value.

CITATION LIST

Patent Literature

[PTL 1]
U.S. Pat. No. 7,783,647

SUMMARY OF INVENTION

Technical Problem

The related art disclosed by Patent Literature 1 reduce the resource usage but the risk of the head or dedicated node becoming bottleneck still remains. Moreover, introducing an estimation or approximation, even if it is bounded, is not suitable for use cases such as billing, which need precise usage statistics.

Solution to Problem

A distributed storage system comprises a plurality of storage nodes which includes multiple resources including multiple kinds of resources. Each of the multiple storage nodes among the plurality of storage nodes is configured to execute an aggregation task which has been assigned to the storage node among aggregation tasks, Each of the aggregation tasks is a task for aggregating statistics relating to a resource among the multiple resources which corresponds to the task, to the storage node to which the task has been assigned.

Advantageous Effects of Invention

According to the present invention, the resources (e.g. CPU, capacity and network) needed to aggregate statistics are evenly distributed across nodes. Therefore, a storage system avoids bottleneck problem in one of the storage nodes and client systems achieve a high and stable performance when accessing data stores across the storage nodes.

BRIEF DESCRIPTION OF DRAWINGS

FIG. 3A shows a configuration example of a storage configuration table according to the first embodiment.

FIG. 3B shows a configuration example of a storage configuration table according to the second embodiment.

FIG. 4 shows a configuration example of a node aggregation load table according to the first embodiment.

FIG. 5A shows a configuration example of a cluster statistics table according to the first embodiment.

FIG. 5B shows a configuration example of a cluster statistics table according to the second embodiment.

FIG. 6A shows a configuration example of an aggregation source table according to the first embodiment.

FIG. 6B shows a configuration example of an aggregation source table according to the second embodiment.

FIG. 9B shows a flow chart for explaining processing according to the second embodiment, which is performed in order to compute and update the aggregation load.

DESCRIPTION OF EMBODIMENTS

Figure 1A:
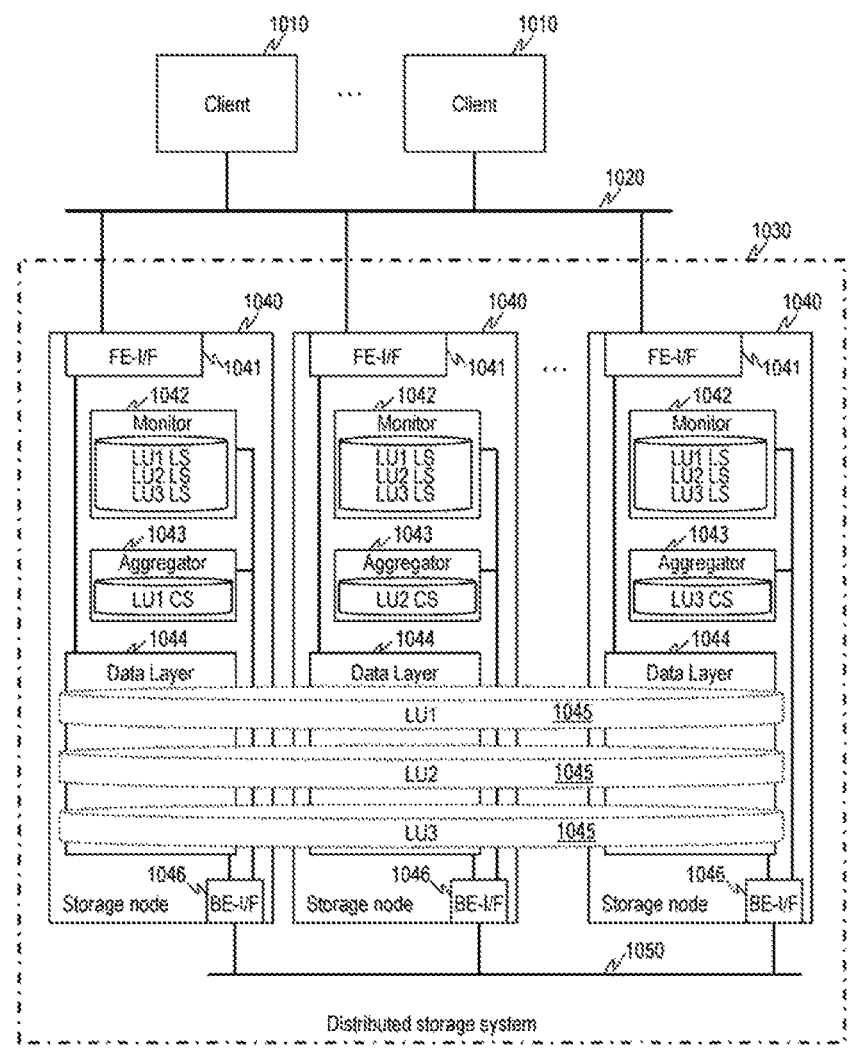
FIG. 1A is a block diagram showing an exemplary configuration of a distributed storage system according to the first embodiment.

A distributed storage system according to at least one of the following two embodiments of the present invention is configured to assign aggregation tasks to storage nodes of the distributed storage system. "Aggregation task" refers to a task for aggregating statistics relating to an LU (which is an example of a resource) from storage nodes providing the LU which corresponds to the task. "LUs (Logical Units)" are an example of data stores. The distributed storage node is also configured to compute and update the aggregation load of each node in the distributed storage system. The present invention can be applied to other kind of distributed storage systems that measure statistics relates to other types of resources such as switches, applications and servers.

The embodiments are explained for the cases of aggregating statistics measured within the distributed storage systems. In the embodiments, "statistic" relates to an LU and can include a storage statistic and another kind of statistic. "Storage statistic" refers to a LU unit statistic, for example, I/O frequency (IOPS (I/O per second)), throughput, and latency. "Another kind of static" refers to a LU unit and host unit statistic such as a host statistic (e.g. IOPS of a host system for an LU).

Each of the embodiments considers two groups of statistics: local statistics and cluster statistics. The groups have been made and named for the sake of the explanation, and could be merged into one group, divided in more groups and named differently.

A local statistic refers to a statistic measured in a node. A local statistic includes three attributes: type (e.g. ITOPS), related resource id (e.g. LU123), and value (e.g. 265,000 IOPS).

A cluster statistic refers to a statistic whose value is the result of aggregating (e.g. adding) the value of one or more local statistics. A cluster statistic includes four attributes: id (e.g. CS15), type (e.g. IOPS), related resource id (e.g. LU123) and value (e.g. 586,000 IOPS).

In the explanation of the embodiments, the statistics attributes have been simplified and reduced to be enough to allow readers to understand the presented invention.

Each of the embodiments is explained for one kind of aggregation: statistics whose value is computed by aggregating local statistics measured in multiple storage nodes for a particular statistic type and related resource id. The present invention can be applied to other kinds of aggregation. For example, statistics whose value is computed by aggregating local statistics measured in a single storage node for a given statistic type and resource type.

As described above, two embodiments are explained. The main difference between the embodiments is the ability of the distributed storage system to measure a local statistic from more than one type of source. For example, the TOPS of LU1 can be measured from one of two types of source: FE-I/F (Front End I/F) and Data Layer. The first embodiment describes the case where the distributed storage system has not that ability or does not use that ability. The second embodiment describes the case where the distributed storage system has that ability and uses it.

As a particular example, there is a distributed storage system comprising five storage nodes N1, N2, N3, N4 and N5, and the distributed storage system has a logical unit LU1. At a given time, the data of LU1 is stored in the Data Layers of storage nodes N1 and N2, and one or more client systems access the data of LU1 by sending requests to the FE-I/Fs of storage nodes N3, N4 and N5. In this particular example, the local statistics of type IOPS of LU1 can be measured two types of sources: (1) in the Data Layers of storage nodes N1 and N2 as data is accessed, and (2) in the FE-I/Fs of storage nodes N3 and N4 as data is requested. In this situation, local statistics are aggregated into cluster statistics by selecting one of the source types. Selecting the source type may be useful to reduce the resources needed for aggregation, e.g. in this particular example, aggregating from the source type Data Layer requires aggregating two local statistics, instead of three local statistics.

In addition, each embodiment describes two cases: (1) when the assignation of aggregation task to storage nodes is done only once for each statistic, and (2) when the assignation can be changed afterwards if needed. The differences for these two cases are clearly explained below in the description of the accompanying drawings.

The two embodiments are explained in detail below with reference to the accompanying drawings. In the accompanying drawings, in some case, functionally the same components are denoted by the same numbers. The accompanying drawings show specific embodiments and implementation examples conforming to the principle of the present invention. However, these drawings are for the understanding of the present invention and are not used to limitedly interpret the present invention.

These embodiments are explained in detail sufficiently for those skilled in the art to carry out the present invention. However, it is necessary to understand that other implementations and forms are also possible and changes of configurations and structures and replacement of various elements are possible without departing from the scope and the spirit of the technical idea of the present invention. Therefore, the following description should not be interpreted to be limited to the description.

Further, as explained later, the embodiment of the present invention may be implemented as software running on a general-purpose computer or may be implemented as dedicated hardware or a combination of software and hardware.

In the following explanation, kinds of information of the present invention are explained according to a "table" format. However, these kinds of information do not always have to be represented in a data structure by a table and may be represented in a data structure of a list, a DB, a queue, or the like or other structures. Therefore, in order to indicate that the information does not depend on the data structure, in some case, "table," "list," "DB," "queue" and the like are simply referred to as "information".

When contents of the kinds of information are explained, expressions such as "identification information, "identifier," "appellation," "name" and "ID" can be used. These expressions can be interchanged.

Kinds of processing in the embodiment of the present invention are explained below using "program" as a subject (an operation entity). However, since the program is executed by a processor to perform set processing using a memory and a communication port (a communication control device), the processing may be explained using the processor as a subject. The processing disclosed using the program as the subject may be processing performed by a computer or an information processing apparatus such as a management server. A part or the entire program may be realized by dedicated hardware or may be formed as a module. Various programs may be installed in computers by a program distribution server or storage media.

Embodiment 1

<Distributed Storage System Configuration>

FIG. 1A illustrates an example of a system configuration of a distributed storage system that provides cluster statistics according to this embodiment. FIG. 1A (and FIG. 1B) represents local statistics (stats) as "LS" and cluster statistics (stats) as "CS".

The distributed storage system (hereinafter "storage system") 1030 is configured to provide access from client systems (hereinafter "clients") 1010 to logical units 1045.

In this embodiment, the storage system 1030 including at least one storage node 1040 and coupled to at least one client system 1010 will be exemplified. The clients 1010 and the storage nodes 1040 are coupled to each other over a network 1020 to, for example send and receive requests to access data in data stores, such as data read and data write requests. Optionally, the storage nodes 1040 are connected to each other over a network 1050 to, for example share data among storage nodes 1040. The networks 1020 and 1050 can be a single network.

A client 1010 is an information system such as a computer that operates and manages digital data such as electronic documents, electronic data or video content data. Clients 1010 access digital data that is stored in the storage system 1030 in order to achieve high accessibility and performance, since a client 1010 can access data from several storage nodes 1040 at the same time and several clients 1010 can share data stored in the storage system 1030.

A storage system 1030 typically comprises multiple storage nodes 1040. A storage system 1030 provides clients 1010 with one or more logical units 1045. In the drawing are exemplified three data stores which are three logical units LU1, LU2 and LU3. A client 1010 can access a logical unit 1045 through one or more storage nodes 1040. A storage system 1030 stores the data of each logical unit 1045 in one or more storage nodes 1040, in a distributed manner, which can also include data protection techniques.

A storage node 1040 comprises at least one FE-I/F 1041 which receives and serves data access requests from clients 1010, a monitor 1042 which measures local statistics related to resources such as logical units 1045, an aggregator 1043 which can aggregates local statistics into cluster statistics, a data layer 1044 which stores all or part of the data of one or more logical units 1045, and a BE-I/F (Back End I/F) 1046 which allows components in the storage node to communicate with components in other storage node 1040.

A monitor 1042 measures local statistics related to or in the scope of its storage node 1040. As a result, monitors 1042 in different storage nodes 1040 can have a local statistic related to the same logical unit 1045 but with a different value. For example, if a client C1 accesses a store using a storage node N1 and other client accesses a store using a storage node N2, the monitor 1042 in the storage node N1 only measures statistics related to the access of client C1. In brief, the monitor 1042 of the storage node 1040 (e.g. N1) is configured to measure statistics (local statistics) relating to specific resources of the storage node 1040 (e.g. N1) and not to measure statistics relating to specific resources of the other storage nodes 1040 (e.g. N2).

An aggregator 1043 is configured to aggregate local statistics into cluster statistics by receiving local statistics from monitors 1042 in one or more storage nodes 1040 through the BE-I/F 1046 and the network 1050. Specifically, the aggregator 1043 of the storage node 1040 can execute aggregation tasks which have been assigned to the storage node 1040. Each of the aggregation tasks is a task for aggregating statistics relating to a logical unit 1045 which corresponds to the task.

A data layer 1044 stores all or part of the data of one or more logical units 1045 and provides access such as data read and data write to all logical units 1045 in the storage system 1030 to clients through the FE-I/F 1041 and the network 1020. When a data layer 1044 receives a request to read data that is stored in a data layer 1044 in other storage node 1040, the data layer 1044 access the data through the BE-I/F 1046 and the network 1050. Similarly, when a data layer 1044 receives a request to write data that should be written in a data layer 1044 in other storage node 1040, the data layer 1044 sends the data through the BE-I/F 1046 and the network 1050. As a result, a client 1010 can read and write data from a logical unit 1045 in the storage system 1030 from any storage node 1040 transparently. The data layer 1044 can include one or more physical non-volatile storage devices such as HDD (Hard Disk Drives) or SSDs (Solid State Drives) which can be basis of logical units.

Each storage node 1040 comprises an interface unit which is one or more interface devices (I/Fs) such as a FE-I/F 1041 and a BE-I/F 1046, a memory unit which is one or more memories, and a processor unit which is one or more processors (e.g. processor cores) coupled to the interface unit and the memory unit. The memory unit stores programs such as applications and an OS (Operating System). The memory unit can store at least a part of statistics (e.g. local statistics and cluster statistics). The processor unit is configured to execute the programs. The processor unit can realize at least a part of the monitor 1042, the aggregator 1043 and the data layer 1044 by executing at least one of the programs.

<Aggregator Configuration>

Figure 2:
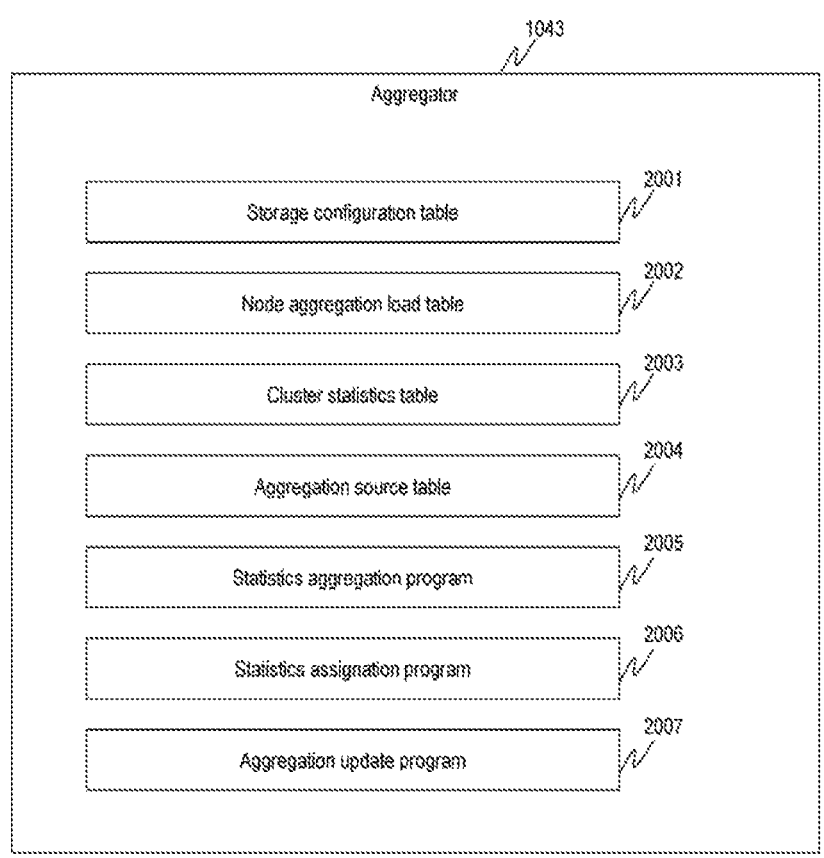
FIG. 2 is a block diagram showing an exemplary configuration of an aggregator according to the first embodiment.

FIG. 2 illustrates an example of a system configuration of an aggregator 1043.

The aggregator 1043 comprises three programs which are a statistics aggregation program 2005, a statistics assignation program 2006 and an aggregation update program 2007 and four tables which is a storage configuration table 2001, a node aggregation load table 2002, a cluster statistics table 2003, and an aggregations source table 2004. At least one of the programs 2005 to 2007 and the tables 2001 to 2004 can be hold in the memory unit in the storage node 1040. The programs 2005 to 2007 can be executed by the processor unit in the storage node 1040.

<Storage Configuration Table>

FIG. 3A shows a configuration example of a storage configuration table 2001 provided in the aggregator 1043.

The storage configuration table 2001 is a table which manages the attributes of resources such as logical units 1045 in the storage system 1030, including the current configuration. This is a global table, i.e. its contents are identical in all storage nodes 1040 in the storage system 1030. The values in the table are updated by the storage system 1030, e.g. on every storage configuration change.

The storage configuration table 2001 has a resource id 3001, which is the information to identify a resource such as a logical unit 1045 in the storage system 1030, a resource owner 3002, which is the information to identify the owner of a resource such as a tenant name or a user name, a resource type 3003, which is the information to describe the type of resource and can include subtypes such as type data store and subtype file store, and a related nodes 3004, which is the information to identify the storage nodes that are currently related to the resource. Resource owners such as tenants or users may be entities using clients 1010. In other words, the storage configuration table 2001 is an example of information denoting relation of connection among clients (e.g. resource owners), storage nodes (e.g. related nodes) and resources (e.g. resource ids).

"Related nodes" refers to the nodes where local statistics of the resource identified by resource id 3001 can be measured. It only refers to the possibility. For example, in the case of a resource of type data store, the related nodes may be only the nodes that have established a path from the data store to a client. The related nodes 3004 is "–" when there are no nodes where a local statistic can be measured yet for the resource identified by the resource id 3001.

It is seen from the storage configuration table 2001 shown in FIG. 3A that the resource with id "R1" is owned by "Dept1", is of type "Block Store (LU)" and is currently related to the nodes with id "N1" and "N2".

<Node Aggregation Load Table>

FIG. 4 shows a configuration example of a node aggregation load table 2002 provided in the aggregator 1043.

The node aggregation load table 2002 is a table which manages the load caused by aggregation in each storage node 1040 currently or the last time it was computed. This is a global table, i.e. its contents are identical in all storage nodes 1040 in the storage system 1030. The table has one row for each storage node 1040 in the storage system 1030.

The node aggregation load table 2002 has a node id 4001, which is the information to identify a storage node 1040, an aggregation load 4002, which is the total amount of local statistics that were retrieved and aggregated the last time by the aggregator 1043 in the storage node 1040 identified by the id 4001, a cluster statistics load 4003, which is the amount of cluster statistics assigned to the storage node 1040 identified by the id 4001, and a resources load 4004, which is the amount of resources that have at least one cluster statistic assigned to the storage node 1040 identified by the id 4001.

The aggregation load 4002 refers to the total amount of local statistics used to aggregate all the cluster statistics assigned to the storage node 1040 identified by the id 4001. The aggregation load 4002 is the value for the last aggregation done when the table values were updated. However, it could represent a trend or an average of, e.g., the last 5 aggregations.

It is seen from the node aggregation load table 2002 in FIG. 4 that the storage node 1040 with id "N1" has 1510 local statistics, 60 cluster statistics and 20 resources.

<Cluster Statistics Table>

FIG. 5A shows a configuration example of cluster statistics table 2003 provided in the aggregator 1043.

The cluster statistics table 2003 is a table which manages the attributes of the cluster statistics in the storage system 1030 relevant for the aggregation, in particular the node assigned to aggregate each cluster statistic. This is a global table, i.e. its contents are identical in all storage nodes 1040 in the storage system 1030. The table has one one row for each cluster statistic in the storage system 1030.

The cluster statistics table 2003 has a cluster statistic id 5001, which is the information to identify a cluster statistic in the storage system 1030, a statistic type 5002, which is the information to identify the type of the cluster statistic identified by the id 5001, a related resource id 5003, which is the information to identify to which resource in the storage system 1030 such as a logical unit 1045 refers the statistic identified by the id 5001, an assigned node 5004, which is the information to identify the storage node 1040 assigned to aggregate the statistic identified by the id 5001, a high contribution nodes 5005, which is the information to identify one or more storage nodes 1040, and a high consumption nodes 5006, which is the information to identify one or more storage nodes 1040.

The high contribution nodes 5005 refers to the nodes that, in the last aggregation, provided a high value for a local statistic used to aggregate the cluster statistic identified by the id 5001. This is useful for usage statistics such as "IOPS" and "Throughput". This column may not be applicable or useful for some types of statistics. This value may not always represent the latest aggregation since it may not be updated constantly. This value could be computed by using a trend or average of the values of the last, e.g., 5 aggregations. The threshold to decide what is a high value can be, e.g., be higher than the average of values, or be the highest.

The high consumption nodes 5006 value refers to the nodes that have been requested, e.g. by an administrator through a management I/F, a high number of times the cluster statistic identified by the id 5001. This is applicable in the storage system 1030 where administrators can request the value of a cluster statistic to any of the storage nodes 1040, and a storage node 1040 retrieves the value from the aggregator 1043 in the storage node 1040 currently assigned to aggregate the cluster statistic. This value may not always represent the latest aggregation since it may not be updated constantly. This value could be computed by using a trend or average of the last, e.g., 5 minutes. The threshold to decide what is a high value can be, e.g., be higher than the average of values, or be the highest.

It is seen from the cluster statistics table 2002 in FIG. 5A that the cluster statistic with id "CS1" of type "IOPS" of the resource with id "R1" is assigned to be aggregated by the storage node 1040 with id "N1", the node "N1" is the node with high contribution to "CS1", and the node "N1" is the only node with high consumption of "CS1".

<Aggregation Source Table>

FIG. 6A shows a configuration example of an aggregation source table 2004 provided in the Aggregator 1043.

The aggregation source table 2004 is a table which manages the current nodes that provided local statistics to aggregate each cluster statistic in the storage system 1030. This is a global table, i.e. its contents are identical in all storage nodes 1040 in the storage system 1030. The table has one row for each cluster statistic in the storage system 1030.

The aggregation source table 2004 has a cluster statistic id 6001, which is the information to identify a cluster statistic in the storage system 1030, a recent source nodes 6002, which is the information to identify one or more storage nodes 1040, and a recent source count 6003, which is a value representing an amount of storage nodes 1040.

The recent source nodes 6002 refers to the nodes that, in the last aggregation, provided a local statistic used to aggregate the cluster statistic identified by the id 6001. This value may not always represent the latest aggregation since it may not be updated constantly. The recent source nodes 6002 could be computed by including all nodes or the common nodes in the last, e.g., 5 aggregations.

The recent source count 6003 refers to the amount of nodes that, in the last aggregation, provided a local statistic used to aggregate the cluster statistic identified in 6001. The recent source count 6003 may not always represent the latest aggregation since it may not be updated constantly. The recent source count 6003 could be computed also as an average or by including all nodes or the common nodes in the last, e.g., 5 aggregations. Note that the recent source count 6003 may not always be the count of 6002, e.g. if an average or most common count of several last aggregations is used.

It is seen from the aggregation source table 2004 in FIG. 6A that the cluster statistic with id "CS1" has been last aggregated using a local statistic from each of the storage nodes 1040 with ids "N1", "N2", "N3" and "N4", and has been last aggregated using as source 4 storage nodes 1040.

<Statistics Aggregation Processing>

Figure 7A:
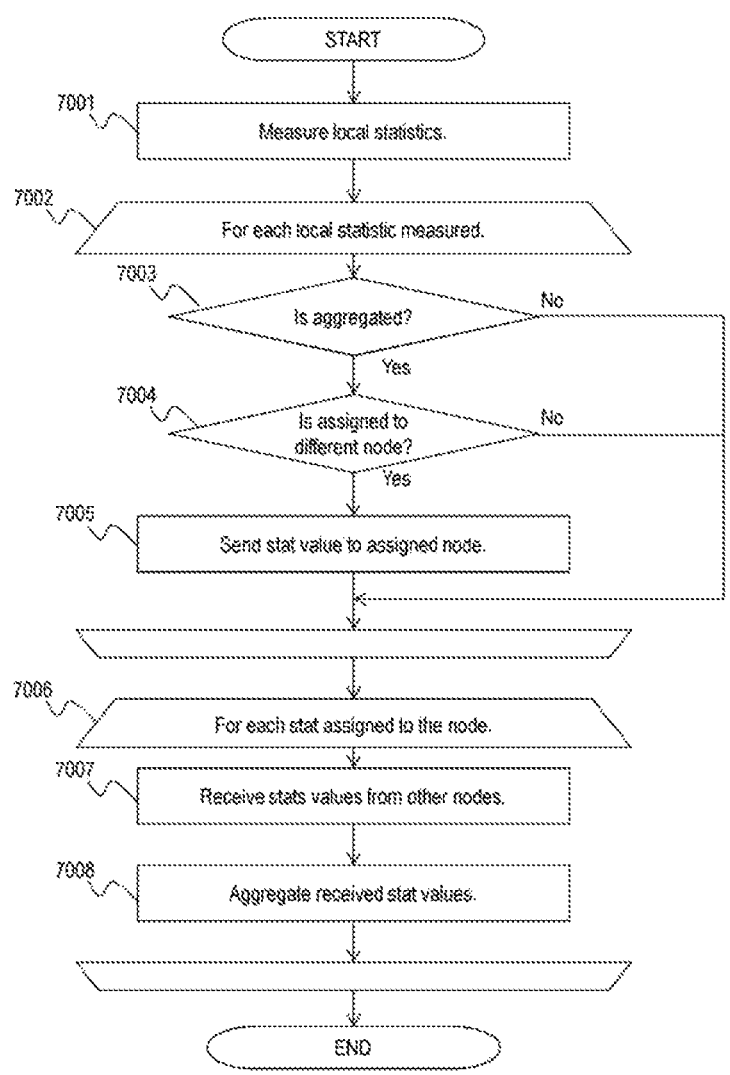
FIG. 7A shows a flow chart for explaining processing according to the first embodiment, which is performed in order to measure and local statistics, and aggregate into cluster statistics.

FIG. 7A is a flow chart for explaining the processing to measure and local statistics, and aggregate into cluster statistics.

The processing is executed in each storage node 1040, periodically at a fixed time interval, e.g. every five seconds. The time interval is the same for all storage nodes 1040 in the storage system 1030 and the processing starts at the same time in all storage nodes 1040. The time interval may be changed by an administrator or changed automatically based, e.g. in an event.

In Step 7001, the statistics aggregation program 2005 requests to the monitor 1042 in the storage node 1040 to measure all the local statistics currently available in the storage node 1040. For example, the local statistic of type IOPS and with related resource R1 is available in the storage node 1040 if the resource R1 has been accessed recently from the storage node 1040.

In Step 7002, the statistics aggregation program 2005 iterates through each local statistics available in the monitor 1042 that have been just measured in Step 7001. When all local statistics have been iterated, the processing goes to Step 7006. The following Steps 7003 to 7005 are executed for each local statistic.

In Step 7003, the statistics aggregation program 2005 refers to the cluster statistics table 2003, the columns 5002 and 5003, to decide whether the local statistic being iterate needs to be aggregated or not. If the local statistic type and related resource matches entries 5002 and 5003 respectively in a row in the cluster statistics table 2003, the statistics aggregation program 2005 concludes that the local statistic needs to be aggregated, and the processing continues to Step 7004.

In Step 7004, the statistics aggregation program 2005 refers to the cluster statistics table 2003, the entry 5004, to decide whether the cluster statistic of the row matched in Step 7003 is set to be aggregated in a different storage node 1040. If the id of the different storage node 1040 matches the entry 5004, the statistics aggregation program 2005 concludes that the cluster statistic is set to be aggregated in the different storage node 1040 and the processing goes to Step 7005.

In Step 7005, the statistics aggregation program 2005 sends the local statistic being iterated to the aggregator 1043 in the different storage node 1040 with the id found by the entry 5004 in Step 7004. In brief, the statistics aggregation program 2005 pushes the local statistic to the aggregator 1043 in the different storage node 1040. Pushing the local statistic from the source node 1040 (the storage node 1040) to the assigned node 1040 (the different storage node 1040) might be more efficient than pulling (getting) the local statistic from the source node 1040 to the assigned node 1040, because there is a possibility where the target local statistic is not in the source node 1040. That is, if the assigned node 1040 accesses the source node 1040 to get the target local statistic when it is not in the source node 1040, the access becomes a needless access.

In Step 7006, the statistics aggregation program 2005 refers to the cluster statistics table 2003, the column 5004, and iterates through each cluster statistic whose row in the table 2003 has the id of the storage node 1040 in the column 5004. When all cluster statistics have been iterated, the processing ends. The following Steps 7007 and 7008 are executed for each l cluster statistic.

In Step 7007, the statistics aggregation program 2005 receives all local statistics sent from other storage nodes 1040, and also gets the local statistics that in Step 7004 were found to be assigned to the storage node 1040.

In Step 7008, the statistics aggregation program 2005 aggregates each cluster statistic in the cluster statistics table 2003 by using the local statistics received in Step 7007. A cluster statistic is aggregated, e.g., by adding the values of each local statistic received that has the same type and related resource. Each statistic may have a different aggregation method, e.g. average value, max value.

<Statistics Assignation Processing>

Figure 8A:
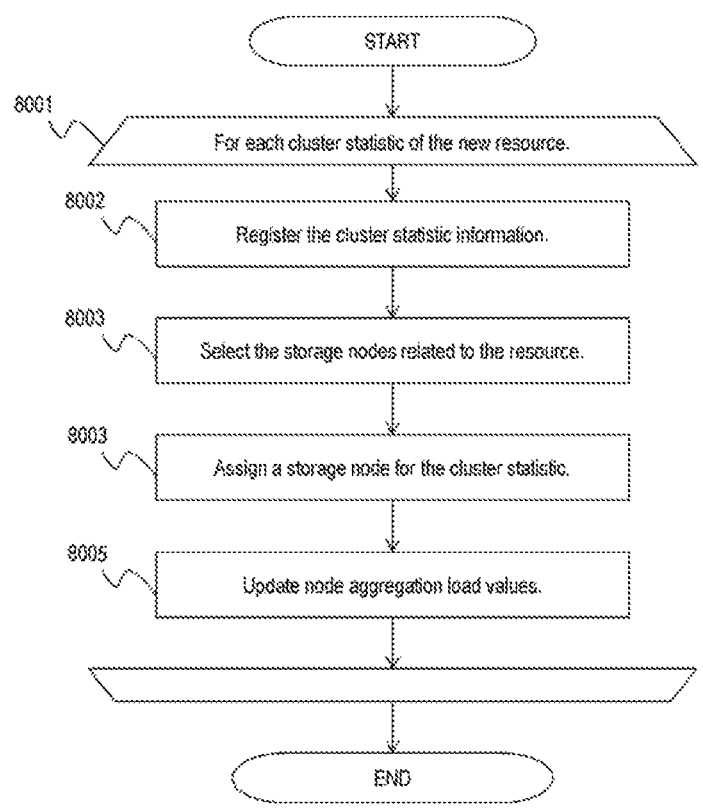
FIG. 8A shows a flow chart for explaining processing according to the first embodiment, which is performed in order to assign an aggregation tasks to a storage node for the first time.

FIG. 8A is a flow chart for explaining the processing to assign aggregation tasks to storage nodes 1040 for the first time.

The processing is executed in only one of the storage nodes 1040 in the storage system 1030, chosen randomly, and at the time when a new resource such as a logical unit 1045 is created in the storage system 1030.

Optionally, e.g. for the case where a resource is a logical unit 1045, the processing can be executed instead on events such as when a path is first established between a logical unit 1045 and a client 1010 (e.g. using the IP address or the WWN (World Wide Name) of the client 1010), or when a logical unit 1045 is first accessed by a client 1010.

Optionally, the storage node 1040 to execute this processing can instead be chosen, e.g., by round-robin or as the storage node 1040 that first establishes a path to the resource, or the storage node 1040 that first measured local statistics for the resource.

When a new resource such as a logical unit 1045 is created in the storage system 1030, and before this processing is executed, it is assumed that the new resource information is inserted into a new row in the storage configuration table 2001. Note that depending on the timing to execute this processing, at the time of executing this processing the new resource may not have any related nodes 3004 yet.

In Step 8001, the statistics assignation program 2006 iterates through each type of cluster statistic that can be computed for the new resource, e.g. by using a knowledge in the storage system 1030 that related resource types 3003 to statistics types 5002. For example, for a resource of type, Block Store (LU), the cluster statistic types that can be computed may be IOPS and Throughput. The knowledge of the cluster statistics for a resource may be, e.g., decided by product designers and fixed, or selected by administrators through a management interface. When all types of cluster statistics have been iterated, the processing ends. The following Steps 8002 to 8005 are executed for each cluster statistic of the new resource.

In Step 8002, the statistics assignation program 2006 inserts a new row in the cluster statistics table 2003 with the information of the cluster statistic being iterated from 8001. The columns 5004, 5005 and 5006 are left empty because their values are not known yet. Also, the statistics assignation program 2006 inserts a new row in the aggregation source table 2004 with the cluster statistic id 6001 and leaving the rest of columns empty because are not known yet.

In Step 8003, the statistics assignation program 2006 refers to the storage configuration table 2001 and identifies the related storage nodes 1040 by the entry 3004 corresponding to the new resource. If the entry 3004 has no value, all storage nodes 1040 are considered related to the new resource. Optionally, this step can consider as related storage nodes 1040 identified by the related nodes 3004 for resources similar to the new resource, e.g. with the same resource owner 3002, and/or the same resource type 3003.

In Step 8004, the statistics assignation program 2006 refers to the node aggregation load table 2002 and selects the rows of the storage nodes 4001 that have been selected in the previous Step 8003 as related storage nodes. Then, from the selected rows, the statistics assignation program 2006 chooses the storage node with lowest load by referring to the columns 4002, 4003 and 4004. For example, the storage node with lowest load may be the storage node with lowest aggregation load 4002. Optionally, the values in the columns 4003 and 4004 may also be taken into consideration. Optionally, if the related nodes selected in Step 8003 have all an aggregation load 4002 very high compared to the rest of nodes, this step may select a storage node that has been not selected in Step 8003, e.g. the storage node with lowest aggregation load 4002 in the storage system 1030. Finally, the step inserts the selected storage node in the cluster statistic table 2003 in the column 5004 as the node assigned to aggregate the cluster statistic. Optionally, although this statistics assignation program 2006 allows the flexibility of assigning a different node for each cluster statistic, the statistics assignation program 2006 could force that all the cluster statistics related to the same resource are to be assigned to the same storage node, e.g. to make easier the process of keeping and retrieving the knowledge of assigned nodes.

In Step 8005, the statistics assignation program 2006 triggers the aggregation update program 2007 so that the values in the node aggregation load table 2002 are updated. This step is optional and can be never executed, or be executed only when the number executions of the statistics assignation program 2006 after the last execution of the aggregation update program 2007 reaches a threshold.

<Aggregation Update Processing>

Figure 9A:
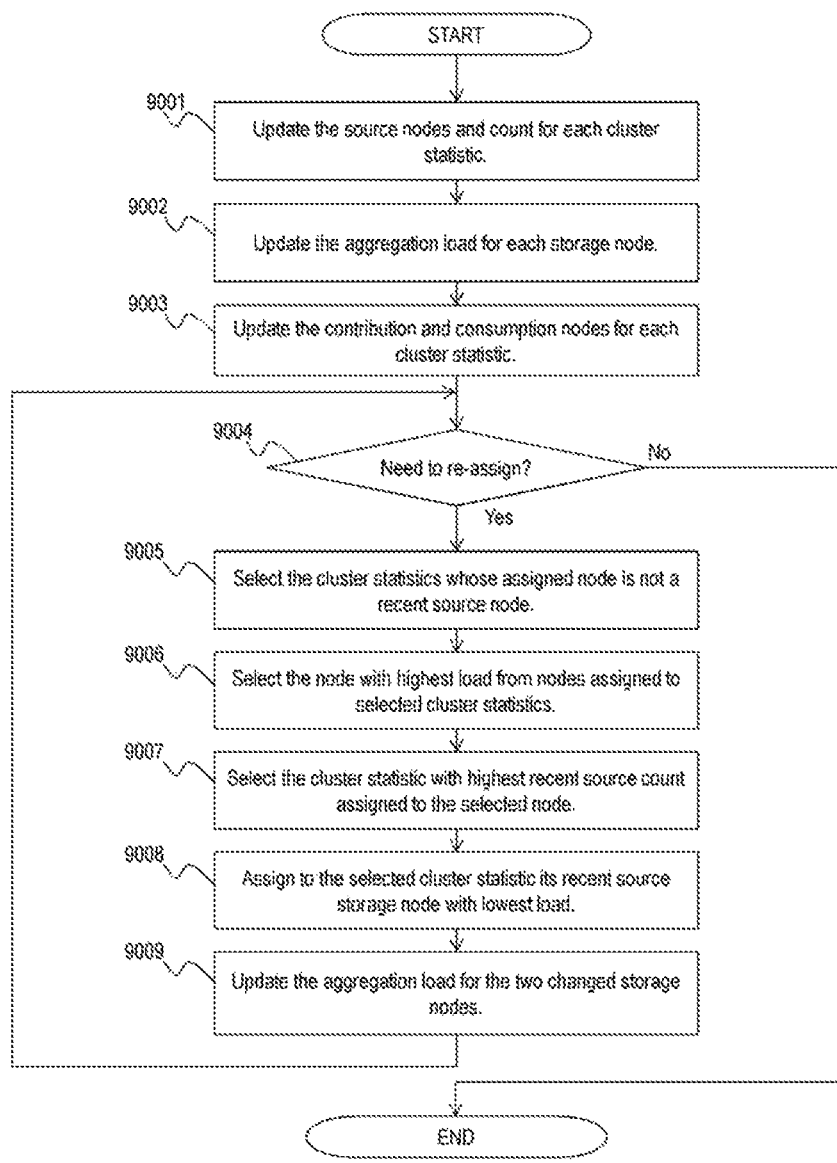
FIG. 9A shows a flow chart for explaining processing according to the first embodiment, which is performed in order to compute and update the aggregation load.

FIG. 9A is a flow chart for explaining processing to compute and update the aggregation load of each node, and optionally select again the node assigned to aggregate each cluster statistic.

The processing is executed in only one of the storage nodes 1040 in the storage system 1030, chosen randomly, and periodically at a fixed time interval, e.g. 5 minutes.

Optionally, the storage node 1040 to execute this processing can instead be chosen, e.g., by round-robin or be set by administrators through a management interface.

Optionally, the processing can be parallelized and executed in all storage nodes 1040 in the storage system 1030, where each storage node updates its own aggregation load and, if needed, assigns again the cluster statistics the storage node has assigned.

Optionally, the processing can be executed when it is triggered by a user action, by an administrator operation or request, or when one of the storage nodes 1040 is in a period of low consumption of resources.

In Step 9001, the aggregation update program 2007 computes and updates the values in the columns 6002 and 6003, according to the last aggregation that has taken place. Optionally, the values can be computed as an average of the last, e.g., five aggregations. The source nodes 6002 and the source count 6003 related to the aggregation of one cluster statistic are known by the aggregator 1043 in the storage node 1040 assigned to aggregate the cluster statistic as reflected in the column 5004 of the cluster statistics table 2003.

In Step 9002, the aggregation update program 2007 computes and updates the values in the columns 4002, 4003 and 4004, according to the values computed and updated by the previous Step 9001 and according to the current assignation of cluster statistics to storage nodes reflected in the column 5004 of the cluster statistics table 2003.

The computation in Step 9002 may not be done completely and may be aware of the changes made by the previous Step 9001 in the aggregation source table 2004 and the changes made by Step 8003 of the statistics assignation program 2006 in the cluster statistics table 2003.

In Step 9003, the aggregation update program 2007 computes and updates the values in the columns 5005 and 5006. This step is optional, only to be done when the values in the columns 5005 and 5006 are taken into account for the node assignation.

The value in the column 5005 is computed by retrieving the contribution of each storage node 1040 source of a cluster statistic for the last aggregation. Optionally, the values can be computed as an average of the last, e.g., five aggregations. Deciding the threshold to consider a value high can be, e.g. when the value is higher than the average or be a fixed threshold. The contribution value of a storage node for a cluster statistic is known by the aggregator 1043 in the storage node 1040 assigned to aggregate the cluster statistic as reflected in column 5004 of the cluster statistics table 2003.

The value in the column 5006 is computed by using the consumption value of each storage node 1040 for a cluster statistic during, e.g., the last 10 minutes. Deciding the threshold to consider a value high can be, e.g. when the value is higher than the average, or be a fixed threshold. The consumption value of a storage node for a cluster statistic is known by the aggregator 1043 in the storage node 1040 assigned to aggregate the cluster statistic as reflected in column 5004 of the cluster statistics table 2003, because when a storage node needs to consume a cluster statistic, requests the cluster statistic to the storage node 1040 assigned to aggregate the statistic.

The following Steps 9004, 9005, 9006, 9007, 9008 and 9009 can be optional, only to be executed for the case when the node assignation is allowed to be changed after it is first assigned. If the steps are not executed, the processing ends.

In Step 9004, the aggregation update program 2007 determines if there is a need to assign again the storage nodes to aggregate each cluster statistic. The step determines that there is a need to assign again when the imbalance in the values in the column 5004 of the cluster statistics table 2003 increases above a threshold. If the step determines that there is a need to assign again, the processing goes to Step 9005. Otherwise, the processing ends. The following Steps 9005, 9006, 9007, 9008 and 9009 select one cluster statistic and assign again its storage node. Then, the need to assign again is computed again in Step 9004. Optionally, the decision can be not made for every cluster statistic that us assigned again, and can be done for every, e.g. 10 cluster statistics assigned again, or until the imbalance decreases below a threshold.

Optionally, determining if there is a need to assign again storage nodes can be done by other methods. For example, it can be based also in the imbalance in the values in the column 5005 and 5006 of the cluster statistics table 2003. For example, it can be based on a count on how many cluster statistics are assigned to a storage node that is not currently a source for its local statistics, as reflected in the column 6002 of the aggregation source table 2004. For example, it can be fixed that always there is a need to assign again. For example, it can be based in the time elapsed since the last time there was a need to assign again. For example, it can be based in the number of new resources or new cluster statistics added since the last time there was a need to assign again. For example, it can be set by administrators through a management interface.

The following Steps 9005, 9006 and 9007 have the objective of selecting one cluster statistic from all cluster statistics in the storage system 1030. Those 3 steps can be optional. If not executed, a cluster statistic can be chosen randomly, or by round-robin, or iteratively so that all cluster statistics are re-assigned if Step 9004 always answers yes.

In Step 9005, the aggregation update program 2007 selects the cluster statistics whose assigned node is not one of its recent source nodes. A cluster statistic is selected when the value in the column 5004 of the cluster statistics table 2003 is not included in the value in the column 6002 in the aggregation source table 2004. This step is useful to reduce the resource require for aggregation because one inter-node communication is avoided when the storage node to aggregate a cluster statistic is also its source.

In Step 9006, the aggregation update program 2007 selects the storage node 1040 with highest load from the storage nodes 1040 assigned to the cluster statistics selected in the previous Step 9005. This step retrieves the storage node 1040 assigned to a cluster statistic by referring to the column 5004 of the cluster statistics table 2003. This step finds the node with highest load by choosing the storage node with a highest value in the column 4002 of the cluster statistics table 2002. This step is useful to regain load balance as soon as possible and with fewer re-assignments.

Optionally, this step can also consider the columns 4003 and 4004 to choose the storage node with the highest load.

Optionally, this step can also consider the storage nodes resource consumption caused by other processes besides of the aggregation of cluster statistics.

In Step 9007, the aggregation update program 2007 selects one cluster statistic from all the cluster statistics assigned to the storage node 1040 selected in the previous Step 9006. This step finds all cluster statistic assigned to a storage node by referring to the column 5004 of the cluster statistics table 2003. This step selects, from the cluster statistics assigned, the cluster statistic with highest recent source count, by referring to the value in the column 6003 in the aggregation source table 2004. This step is useful to regain load balance as soon as possible and with fewer re-assignments.

In Step 9008, the aggregation update program 2007 assigns a storage node to the cluster statistic selected in the previous Step 9007. This step assigns a storage node to a cluster statistic by setting the id of the storage node to the column 5004 of the cluster statistics table 2003 in the row with the cluster statistic id 5001. This step chooses as storage node to aggregate a cluster statistic the storage node that is recent source of the cluster statistic and has the lowest load. First, this step selects the storage nodes that are recent source of a cluster statistic by referring to the column 6002 of the aggregation source table 2004. Then, this step selects the storage node with a lowest value in the column 4002 of the cluster statistics table 2002.

In Step 9009, the aggregation update program 2007 computes and updates the values in the columns 4002, 4003 and 4004, according to the re-assignation done in the previous Step 9008. This step only needs to update two storage nodes: the storage node that was assigned previously and the storage node that has been assigned.

Embodiment 2

In the first embodiment, the monitor 1042 provides only one local statistic for each type of statistic and logical unit 1045. However, statistics can be measured from more than one type of source, i.e. from more than one component. The second embodiment describes the case when the storage nodes 1040 in the storage system 1030 are able to measure and provide local statistics from more than one type of source.

The second embodiment is different from the first embodiment in the FIG. 1A, FIG. 3A, FIG. 5A, FIG. 6A, FIG. 7A, FIG. 8A and FIG. 9A. In the second embodiment, the differences are explained using the FIG. 1B, FIG. 3B, FIG. 5B, FIG. 6B, FIG. 7B, FIG. 8B and FIG. 9B, respectively.

<Alternative Storage System Configuration>

Figure 1B:
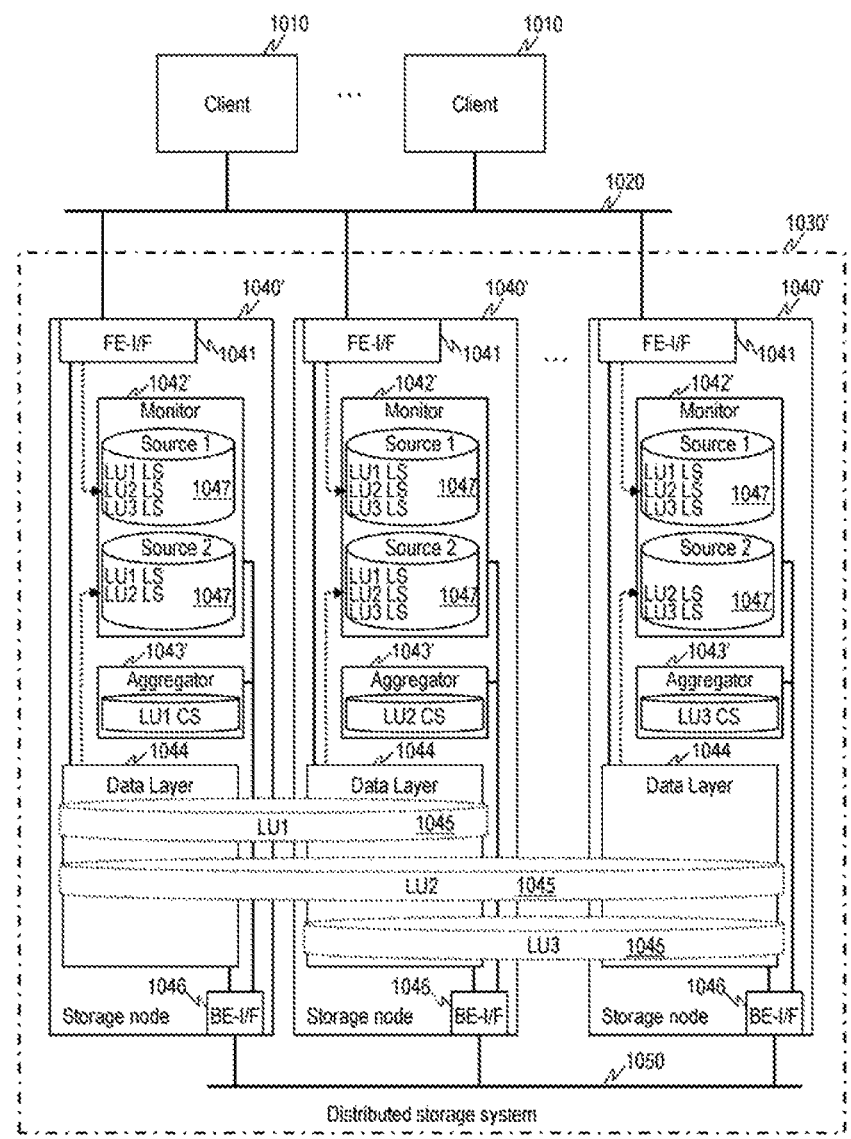
FIG. 1B is a block diagram showing an exemplary configuration of a distributed storage system according the second embodiment.

FIG. 1B illustrates an example of an alternative system configuration of a storage system that provides aggregated statistics according to this embodiment.

The main difference between this figure FIG. 1B and the FIG. 1A used to describe the first embodiment is the monitor 1042', which can provide local statistics 1047 from different types of sources 1047. In accordance with the difference, the storage system 1030', the storage nodes 1040', the aggregators 1043', the storage configuration tables 2001' (FIG. 3B), the cluster statistics tables 2003' (FIG. 5B), the aggregation source tables 2004' (FIG. 6B), the statistics aggregation program 2005' (FIG. 7B), the statistics assignation program 2006' (FIG. 8B) and the aggregation update program 2007' (FIG. 9B) are different from the first embodiment.

In this embodiment, a monitor 1042' is able to measure local statistics from more than one source. A monitor 1042' can be configured to measure local statistics related to a resource from all the available sources, from some of them or from one of them. As a result, a monitor 1042' in a storage node 1040' can have several local statistics related to the same logical unit 1045 but with a different value. In the drawing there are two types of source exemplified: the FE-I/F 1041 and the data later component. For example, if a client C1 accesses, via the FE-I/F 1041 of the storage node N1, data stored in the data layer 1044 of the storage node N2, the monitor 1042' in the storage node N1 can measure access statistics from the FE-I/F 1041 and the monitor 1042' in the storage node N2 can measure access statistics from the data layer 1044.

<Alternative Storage Configuration Table>

FIG. 3B shows an alternative configuration example of the storage configuration table 2001' provided in the Aggregator 1043'.

The only difference between this table FIG. 3B and the table FIG. 3A used to describe the first embodiment is the related node 3004.

In this embodiment, the storage configuration table 2001' has several related nodes columns 3005 and 3006. There is a related nodes column for each different kind of source than can be used to measure statistics in the storage system 1030'.

The Related nodes column for a particular kind of source, e.g. 3005, refers to the nodes where local statistics of the resource identified by the id 3001 can be measured using the particular kind of source. It only refers to the possibility. The drawing exemplifies two kinds of sources: source 1 and source 2. For example, the storage system 1030' can measure statistics related to data stores from two kinds of sources: FE-I/F 1041 and data layer 1044. In that example, the related nodes for a data store (an LU) and the first kind of source are the nodes that that have established a path from the data store to a client, and the related nodes for a data store and the second kind of source are the nodes that hold data for the data store.

The Related nodes column for a particular kind of source has the value "–" when there are no nodes where a local statistic of the resource identified in 3001 can be measured yet.

The Related nodes column for a particular kind of source has also the value "–" when the particular kind of source is not suitable for the resource identifies in 3001, i.e. the resource has no stats that can be measured from the particular kind of source.

It is seen from the storage configuration table 2001' in FIG. 3B that the resource with id "R1" is owned by "Dept1", is of type "Block Store (LU)", is currently related to the nodes with id "N1" and "N4" for the source 1, and is currently related to the nodes with id "N3" and "N4" for the source 2.

<Alternative Cluster Statistics Table>

FIG. 5B shows an alternative configuration example of a cluster statistics table 2003' provided in the aggregator 1043'.

The only difference between this table FIG. 5B and the table FIG. 5A used to describe the first embodiment is the addition of the last column selected aggregation source 5007.

In this embodiment, the cluster statistics table 2003' has also a column selected aggregation source 5007, which is the information to identify a kind of source to measure a local statistic, which is the local statistic that is used to aggregate the cluster statistic identified by the id 5001. Only one kind of source can be identified. Examples of sources are the FE-I/F 1041 and the data Layer 1044.

It is seen from the cluster statistics table 2003' in FIG. 5B that the cluster statistic with id "CS1" of type "TOPS" of the resource with id "R1" is assigned to be aggregated by the storage node 1040' with id "N1", the node "N1" is the node with high contribution to "CS1", the node "N1" is the only node with high consumption of "CS1", and the source "Source 1" is the kind of source selected to aggregate "CS1".

<Alternative Aggregation Source Table>

FIG. 6B shows an alternative configuration example of an aggregation source table 2004' provided in the aggregator 1043'.

The only difference between this table FIG. 6B and the table FIG. 6A are the columns Resource source nodes 6002 and Recent source count 6003.

In this embodiment, the aggregation source table 2004' has a resource source nodes and a recent source count columns for each different kind of source than can be used to measure statistics in the storage system 1030'.

The Resource source nodes column for a particular kind of source, e.g. 6004, refers to the nodes that, in the last aggregation, measured a local statistic in the particular kind of source which is related to the cluster statistic identified by the id 6001, i.e. has the same statistic type and the same related resource id. Note that this is different from 6002 in that the local statistic may not have been used for aggregation. This value may not always represent the latest aggregation since it may not be updated constantly. This value could be computed by including all nodes or the common nodes in the last, e.g., 5 aggregations.

The Resource source count column for a particular kind of source, e.g. 6005, refers to the amount of nodes that, in the last aggregation, measured a local statistic in the particular kind of source which is related to the cluster statistic identified by the id 6001, i.e. has the same statistic type and the same related resource id. Note that this is different from 6003 in that the local statistic may not have been used for aggregation. This value may not always represent the latest aggregation since it may not be updated constantly. This value could be computed also as an average or by including all nodes or the common nodes in the last, e.g., 5 aggregations. Note that this value may not always be the count of the Resource source nodes column, e.g. when an average or most common count of several last aggregations is used.

It is seen from the aggregation source table 2004' in FIG. 6B that, for source 1, the ids of the nodes that have measured a local statistic related to "CS1" are "N1", "N2", "N3" and "N4" and the nodes count is "4", and, for source 2, only the node with id "N1" has measured a local statistic related to "CS1" and the nodes count is "1".

<Alternative Statistics Aggregation Processing>

Figure 7B:
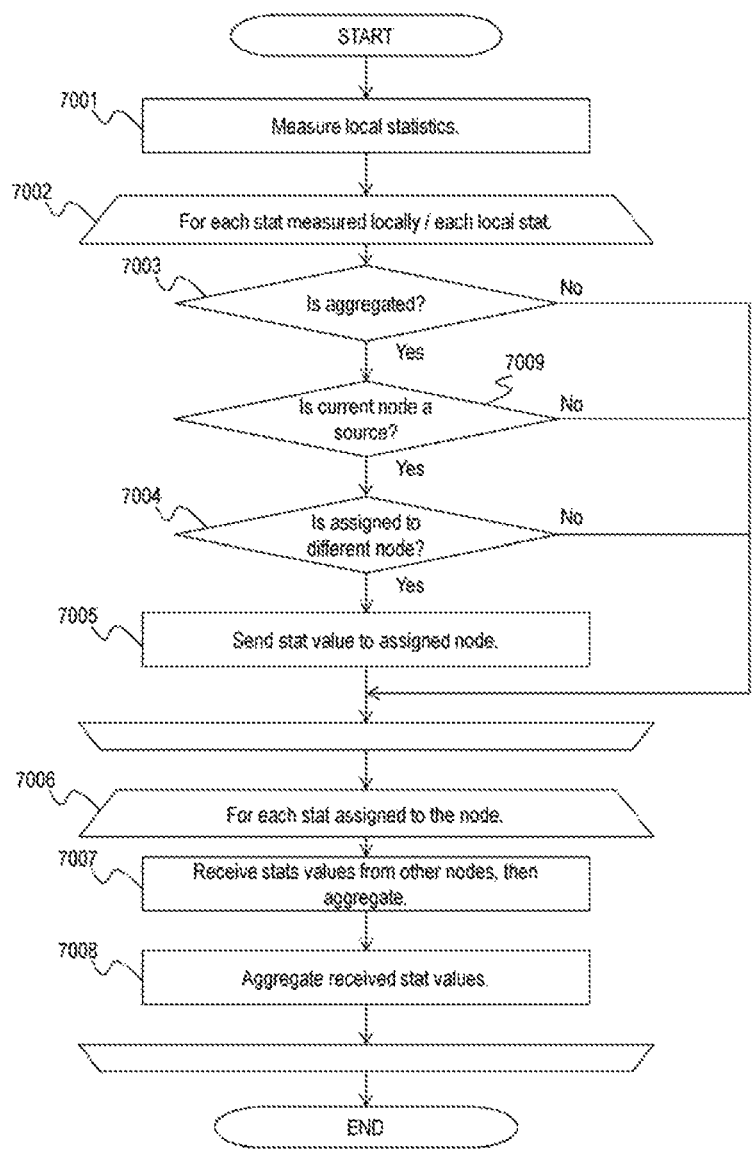
FIG. 7B shows a flow chart for explaining processing according to the second embodiment, which is performed in order to measure and local statistics, and aggregate into cluster statistics.

FIG. 7B is an alternative flow chart for explaining the processing to measure and local statistics, and aggregate into cluster statistics.

The only difference between this processing FIG. 7B and the processing FIG. 7A is the addition of Step 7009. Besides, notes are explained for Step 7001.

In this embodiment, in Step 7001 the monitor 1042' measures local statistics from all kinds of sources available in the storage node 1040' Optionally, if the local statistics are not needed for other purposes, the monitor 1042' can measure only the local statistics from the kids of sources that are selected in 5007 for the related cluster statistic.

In Step 7009, the statistics aggregation program 2005' refers to the cluster statistics table 2003, the column 5007, to decide whether the source of the local statistic being iterated is the source selected to be used to aggregate the cluster statistic that was matched in Step 7003. If the source of the local statistic is the same as the entry 5007, the processing goes to Step 7004. Otherwise, the processing goes to Step 7002 and iterates through the next local statistic.

<Alternating Statistics Assignation Processing>

Figure 8B:
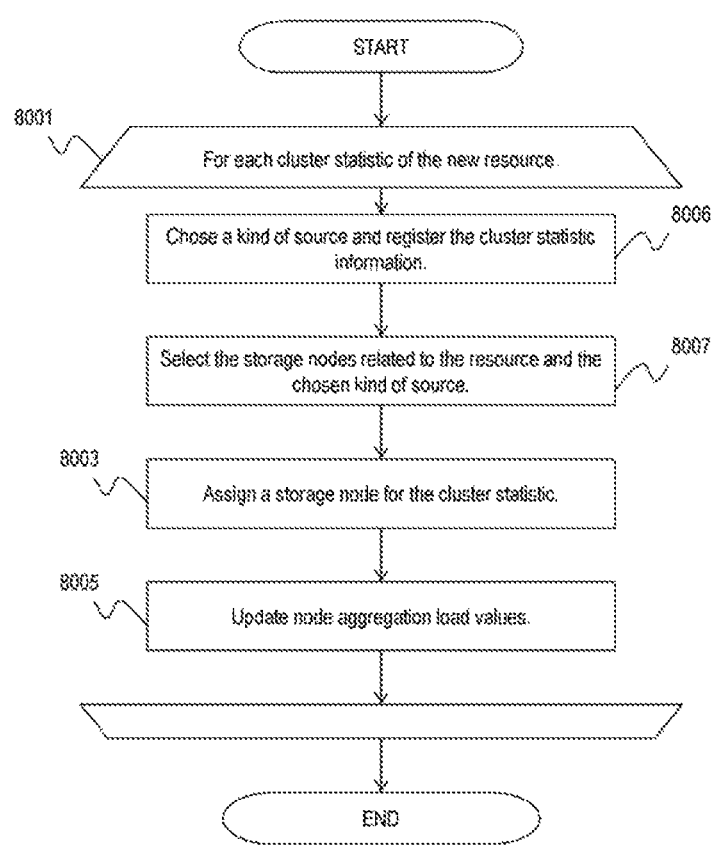
FIG. 8B shows a flow chart for explaining processing according to the second embodiment which is performed in order to assign an aggregation task to a storage node for the first time.

FIG. 8B is an alternative flow chart for explaining processing to assign aggregation tasks to storage nodes for the first time.

The only difference between this processing FIG. 8B and the processing FIG. 8A is the replacement of Steps 8002 and 8003 by Steps 8006 and 8007.

In Step 8006, the statistics assignation program 2006' inserts a new row in the cluster statistics table 2003' with the information of the cluster statistic being iterated from Step 8001. The columns 5004, 5005 and 5006 are left empty because their values are not known yet. Also, the statistics assignation program 2006' selects one kind of source for the aggregation of the cluster statistic from the kinds of source available and inserts the value in the column 5007. The kinds of sources for the aggregation of a cluster statistic can be known as a fixed knowledge set by the product designers. The selection of one kind of source can be fixed and decided beforehand by the product designers, or selected by administrators. Finally, the statistics assignation program 2006' inserts a new row in the aggregation source table 2004 with the cluster statistic id in the column 6001 and leaving the rest of columns empty because are not known yet.

Optionally, in Step 8006, the selection of one kind of source can be done based on the related resources or related cluster statistics. Two resource are related, e.g. if share the same owner 3002 and/or are of the same type 3003. Two cluster statistics are related if are related to the same resource 5003 and/or are of the same type 5002. When selecting a kind of source based on related cluster statistics already being measured, the statistics assignation program 2006' refers to the aggregation source table 2004' to the recent source count 6005 and 6007, and selects the kind of source with lowest value for recent source count.

In Step 8007, the statistics assignation program 2006' refers to the storage configuration table 2001' and identifies the related storage nodes 1040 for the new resource and for the selected kind of source in Step 8006. For example, if source 1 was selected, the related nodes are identified by the column 3005, and if source 2 was selected, the related nodes are identified by the column 3006. If the column considered, 3005 or 3006 has no value, all storage nodes 1040' are considered related to the new resource.

Optionally, Step 8007 can consider as related storage nodes 1040' for resources similar to the new resource, e.g. with the same resource owner 3002, and/or the same resource type 3003.

<Alternative Aggregation Update Processing>

FIG. 9B is an alternative flow chart for explaining the processing and update the aggregation load.

The only difference between this processing FIG. 9B and the processing FIG. 9A is the replacement of Step 9001 by Step 9010.

In Step 9010, the aggregation update program 2007' computes and updates the values in the columns 6004, 6005, 6006 and 6007, according to the last aggregation that has taken place. This step may need to request to the monitor 1042' to measure also the local statistics for the kinds of sources not selected. Optionally, the values can be computed as an average of the last, e.g., five aggregations. The source nodes 6002 and the source count 6003 related to the aggregation of one cluster statistic are known by the aggregator 1043' in the storage node 1040' assigned to aggregate the cluster statistic as reflected in column 5004 of the cluster statistics table 2003'. Finally, based on the new values updated in the aggregation source table 2004', the kind of source for each cluster statistic is selected again as the kind of source with lowest recent source count by comparing the values in columns 6005 and 6007. The selected kind of source for a cluster statistic is updated in column 5007 of cluster statistics table 2003'.

In this step, the update of recent source nodes and recent source count for the kind of sources not selected for a cluster statistic, and the re-selection of the kind of source for a cluster statistic is optional, and it will only be executed for the case when the node assignment is allowed to be changed after it is first assigned.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

For example, the distributed storage system comprises a plurality of storage nodes which includes multiple resources including multiple kinds of resources. Each of the multiple storage nodes among the plurality of storage nodes is configured to execute an aggregation task which has been assigned to the storage node among aggregation tasks, Each of the aggregation tasks is a task for aggregating statistics relating to a resource among the multiple resources which corresponds to the task, to the storage node to which the task has been assigned.

Like FIG. 1B, it is assumed that the first storage node (N1) provides not a third logical unit (LU3) but first and second logical units (LU1 and LU2), a client can access LU1 and LU2 via the FE-I/F of N1, and the client can access LU3 on other servers via the FE-I/F of N1. In such a case, N1 can be one of first source nodes of statistics (this statistics can be obtained from the FE-I/F) relating to LU3 because the client can access LU3 via the FE-I/F of N1, however N1 cannot be one of second source nodes of statistics (this statistics can be obtained from the data layer or the BE-I/F) relating to LU3 because N1 doesn't provide LU3.

The aggregation tasks may be assigned to multiple storage nodes (e.g. all the storage nodes) of the plurality of storage nodes in advance or by at least one storage node of the distributed storage system initially.

At least one of the plurality of storage nodes may assign the aggregation tasks to the multiple storage nodes.

The at least one of the plurality of storage nodes may assign the aggregation tasks based on information denoting relation of connection among the resources, the clients and the plurality of storage nodes. This information may be stored in at least one node of the storage nodes.

The at least one of the plurality of storage nodes may assign, when a resource has been added in one or more of the plurality of storage nodes, an aggregation task for aggregating statistics relating to the added resource, based on a current configuration as for the added resource or a resource whose attributes is similar to attributes of the added resource.

An aggregation task for aggregating statistics relating to a resource may be assigned to a storage node which is accessed from a client so that the client access the resource and/or which includes at least a part of the resource, so that the inter-node communications between monitor components 1042 and aggregator components 1043 are reduced.

The at least one of the plurality of storage nodes may assign, for a resource, the aggregation task, based on information denoting the number of aggregation source nodes of the resource. This information may be stored in at least one node of the storage nodes.

Each of the plurality of storage nodes may include multiple aggregation sources. Each of the multiple aggregation sources may store statistics of resources. For each of one or more of the plurality of storage nodes, resources of statistics may be different among the multiple aggregation sources in the storage node. For each of the multiple aggregation sources, an aggregation source node for a resource may be a storage node includes the aggregation source being configured to store statistics of the resource. For the resource, the at least one of the plurality of storage nodes may select one of the multiple aggregation sources, based on the number of aggregation source nodes for each of the multiple aggregation sources. The at least one of the plurality of storage nodes may assign the aggregation task based on the information denoting the number of aggregation source nodes for the selected aggregation source.

Each of the plurality of storage nodes may receive an access to a resource from at least one of the clients via front-end of the storage node. Each of the plurality of the storage nodes may access to a resource in one or more other storage nodes of the plurality of storage nodes via back-end of the storage node. The multiple aggregation sources in each of the plurality of storage nodes may include a first source for the front-end and a second source for the back-end.

The at least one of the plurality of storage nodes may assign, based on information denoting a storage node which receives, from an administrator, a statistic request which is a request of statistics of a specific resource, the aggregation task for aggregating statistics relating to the specific resource, to the storage node which receives the statistic request. This information may be stored in at least one node of the storage nodes.

The at least one of the plurality of storage nodes is configured to dynamically change an arrangement of aggregation tasks in at least a part of the plurality of storage nodes, based on information denoting operational status of the plurality of storage nodes. This information may be stored in at least one node of the storage nodes.

The at least one of the plurality of storage nodes may change the arrangement of aggregation tasks if the information denotes load imbalance of the plurality of storage nodes increases reaching a first threshold.

The at least one of the plurality of storage nodes may stop changing the arrangement of aggregation tasks if the information denotes load imbalance of the plurality of storage nodes decreases reaching a second threshold.

The at least a part of the plurality of storage nodes may be storage nodes having higher priorities than priorities of the other part of the plurality of storage nodes.

REFERENCE SIGNS LIST 1030, 1030': Distributed storage system

The invention claimed is:

1. A distributed storage system coupled to one or more clients, comprising:
a plurality of storage nodes including multiple resources,
each of multiple storage nodes among the plurality of storage nodes being configured to execute an aggregation task which has been assigned to the storage node among aggregation tasks,
each of the aggregation tasks being a task for aggregating statistics relating to a resource among the multiple resources which corresponds to the task, to the storage node to which the task has been assigned, wherein
at least one of the plurality of storage nodes is configured to assign the aggregation tasks to the multiple storage nodes,
the at least one of the plurality of storage nodes is configured to assign, for a resource, the aggregation task, based on information denoting the number of aggregation source nodes of the resource.

2. The distributed storage system according to claim 1, wherein
the at least one of the plurality of storage nodes is configured to assign the aggregation tasks based on information denoting relation of connection among the resources, the clients and the plurality of storage nodes.

3. The distributed storage system according to claim 2, wherein
the at least one of the plurality of storage nodes is configured to assign, when an resource has been added in one or more of the plurality of storage nodes, an aggregation task for aggregating statistics relating to the added resource, based on a current configuration as for the added resource or a resource whose attributes is similar to attributes of the added resource.

4. The distributed storage system according to claim 2, wherein
an aggregation task for aggregating statistics relating to a resource is assigned to a storage node which is accessed from a client so that the client access the resource and/or which includes at least a part of the resource.

5. The distributed storage system according to claim 1, wherein
each of the plurality of storage nodes includes multiple aggregation sources,
each of the multiple aggregation sources is configured to store statistics of resources,
for each of one or more of the plurality of storage nodes, resources of statistics are different among the multiple aggregation sources in the storage node,
for each of the multiple aggregation sources, an aggregation source node for a resource is a storage node includes the aggregation source being configured to store statistics of the resource,
for the resource, the at least one of the plurality of storage nodes is configured to select one of the multiple aggregation sources, based on the number of aggregation source nodes for each of the multiple aggregation sources, and
the at least one of the plurality of storage nodes is configured to assign the aggregation task based on the information denoting the number of aggregation source nodes for the selected aggregation source.

6. The distributed storage system according to claim 5, wherein
each of the plurality of the storage nodes is configured to receive an access to a resource from at least one of the clients via front-end of the storage node,
each of the plurality of the storage nodes is configured to access to a resource in one or more other storage nodes of the plurality of storage nodes via back-end of the storage node,
the multiple aggregation source in each of the plurality of the storage nodes includes a first source for the front-end and a second source for the back-end.

7. The distributed storage system according to claim 2, wherein
the at least one of the plurality of storage nodes is configured to assign, based on information denoting a storage node which receives, from an administrator, a statistic read request which is a request to read the values of statistics of a specific resource, the aggregation task for aggregating statistics relating to the specific resource, to the storage node which receives the statistic request.

8. The distributed storage system according to claim 1, wherein
the at least one of the plurality of storage nodes is configured to dynamically change an arrangement of aggregation tasks in at least a part of the plurality of storage nodes, based on information denoting operational status of the plurality of storage nodes.

9. The distributed storage system according to claim 8, wherein
the at least one of the plurality of storage nodes is configured to change the arrangement of aggregation tasks if the information denotes load imbalance of the plurality of storage nodes increases reaching a first threshold.

10. The distributed storage system according to claim 8, wherein
the at least one of the plurality of storage nodes is configured to stop changing the arrangement of aggregation tasks if the information denotes load imbalance of the plurality of storage nodes decreases reaching a second threshold.

11. The distributed storage system according to claim 8, wherein
the part of the plurality of storage nodes is storage nodes having higher priorities than priorities of the other part of the plurality of storage nodes.

12. A method for aggregating statistics in a distributed storage system comprising a plurality of storage nodes including multiple resources, executing, by each of multiple storage nodes among the plurality of storage nodes, an aggregation task which has been assigned to the storage node among aggregation tasks, each of the aggregation tasks being a task for aggregating statistics relating to a resource among the multiple resources which corresponds to the task, to the storage node to which the task has been assigned, wherein at least one of the plurality of storage nodes is configured to assign the aggregation tasks to the multiple storage nodes, the at least one of the plurality of storage nodes is configured to assign, for a resource, the aggregation task, based on information denoting the number of aggregation source nodes of the resource.

* * * * *